(12) United States Patent
Hirst et al.

(10) Patent No.: US 8,506,748 B2
(45) Date of Patent: Aug. 13, 2013

(54) IMAGING PROCESS FOR FLOORING MATERIAL

(75) Inventors: Paul Hirst, Sheffield (GB); Simon Wells, Sheffield (GB)

(73) Assignee: Octi Tech Limited, LLC, Salt Lake City, UT (US)

( * ) Notice: Subject to any disclaimer, the term of this patent is extended or adjusted under 35 U.S.C. 154(b) by 173 days.

(21) Appl. No.: 13/011,406

(22) Filed: Jan. 21, 2011

(65) Prior Publication Data

US 2011/0180202 A1 Jul. 28, 2011

Related U.S. Application Data

(60) Provisional application No. 61/297,484, filed on Jan. 22, 2010.

(51) Int. Cl.
*B29C 65/02* (2006.01)
*B32B 37/06* (2006.01)
*B32B 37/14* (2006.01)
*B32B 38/14* (2006.01)

(52) U.S. Cl.
USPC .............................. 156/277; 156/84; 156/709

(58) Field of Classification Search
USPC ........................................ 156/84, 709, 277
See application file for complete search history.

(56) References Cited

U.S. PATENT DOCUMENTS

| 3,962,009 A | * | 6/1976 | Minami et al. .................. 156/85 |
| 4,232,076 A | * | 11/1980 | Stetson et al. ................. 428/158 |
| 4,881,999 A | | 11/1989 | Balmer et al. |
| 5,082,708 A | * | 1/1992 | Kauffman et al. .............. 428/47 |
| 5,635,266 A | | 6/1997 | Quinn et al. |
| 7,182,837 B2 | | 2/2007 | Chen et al. |
| 2002/0142145 A1 | | 10/2002 | Lenderink |
| 2003/0035917 A1 | * | 2/2003 | Hyman .......................... 428/67 |
| 2004/0026017 A1 | * | 2/2004 | Taylor et al. .................. 156/230 |

FOREIGN PATENT DOCUMENTS

| EP | 864118 | | 9/1998 |
| EP | 1176028 A1 | | 1/2002 |
| WO | WO 9720252 A1 | * | 6/1997 |
| WO | WO 2011091266 A3 | * | 12/2011 |

* cited by examiner

*Primary Examiner* — Sonya Mazumdar
(74) *Attorney, Agent, or Firm* — B. Craig Killough; Barnwell Whaley Patterson & Helms, LLC

(57) ABSTRACT

A method is provided for imaging vinyl flooring material. Images are formed on vinyl flooring material having enhanced thermomechanical properties using heat activated imaging methods. Minimum shrinkage of the flooring substrate and minimum image deformation are provided by the invention.

17 Claims, 3 Drawing Sheets

US 8,506,748 B2

IMAGING PROCESS FOR FLOORING MATERIAL

Applicant claims the benefit of U.S. Provisional Application Ser. No. 61/297,484 filed Jan. 22, 2010.

FIELD OF THE INVENTION

This invention relates to imaging of flooring materials, and is more specifically directed to imaging synthetic and resinous flooring materials by a novel image transfer process.

BACKGROUND OF THE INVENTION

Synthetic and/or resinous materials have been long used in flooring applications. Flooring materials such as floor tiles comprising vinyls, including polyvinyl chloride, are in use. Such flooring materials offer water resistance, low cost, mold-resistance and mechanical stability under common household and commercial application conditions.

Mass production of vinyl floor materials may use thermal molding of the vinyl material. Calendaring of sheet-like floor tiles is performed through the application of heat and pressure, and heat and pressure may be used in the surface smoothing process. To speed up manufacturing, methods of rapidly cooling to ambient temperature are used.

Fast cooling of vinyl materials, with or without other ingredients, especially in sheeting shape, impart a 'thermal memory' for the vinyl resin or vinyl thermoplastic materials that can change over time. In time the material will decrease in size along sheeting dimensions. When the temperature of the material approaches the softening temperature, even without substantial pressure applied to the material, shrinkage becomes a problem. Therefore, when vinyl flooring is used with processes where heat is applied above ambient temperatures, such as image transfer processes, undesired shrinkage results.

Thermal transfer imaging generally involves temperatures that are 350° F. or more. These temperatures are substantially above the softening temperature of the vinyl resins or thermoplastics. Shrinkage of more than 10% can take place, which substantially distorts the image quality, and reduces the physical dimensions of the flooring materials.

In order to assist thermal forming of vinyl/linoleum floor materials, plasticizers such as phthalates and other plasticizers are sometimes used. These plasticizers are liquid at ambient temperature, either in pure form or in a mixture with vinyl floor compositions, without chemically bonding. These plasticizers decrease thermal stability, and are colorant solvents. Slow evaporation overtime, and migration inside the flooring matrix, causes dissolution of the colorants by the plasticizers, which distort the image quality.

Thermoplastic materials such as polyvinyl chloride, polyvinyl acetate and the like often used in the floor tile to provide linear molecular structure suitable for thermomechanical molding. However, there is inadequate 3-dimensional stability required for a later heating process, such as is used with heat transfer imaging. This may be true even when the temperature and/or pressure of the flooring material fluctuates, either alone or in combination. Chemicals such as household cleaning materials, organic solvents, bleaching chemicals and enzymatic substances may also alter the polymer matrix of thermoplastic materials during usage.

To improve mechanical strength or durability, a top coating may be applied to the surface of the vinyl flooring material with inorganic filler particles, such as $Al_2O_3$ and $SiO_2$. Without considering receptive properties or permeation properties, these coatings demonstrate poor thermal cohesive properties after the heat transfer imaging printing process is applied, largely due to the differences in the thermal expansion coefficient. The coating may also interfere with the image transfer.

SUMMARY OF THE INVENTION

A novel imaging method is provided for flooring materials. The process is directed to heat transfer of printed images to a flooring material. Images formed on a transfer medium by inks or toners, including inks or toners comprising heat transferable colorants such as sublimation dyes, are heat transferred onto vinyl flooring materials. An enhanced thermomechanical property or the flooring material that inhibits shrinkage from heat exposure.

DESCRIPTION OF THE INVENTION

Figure 1:
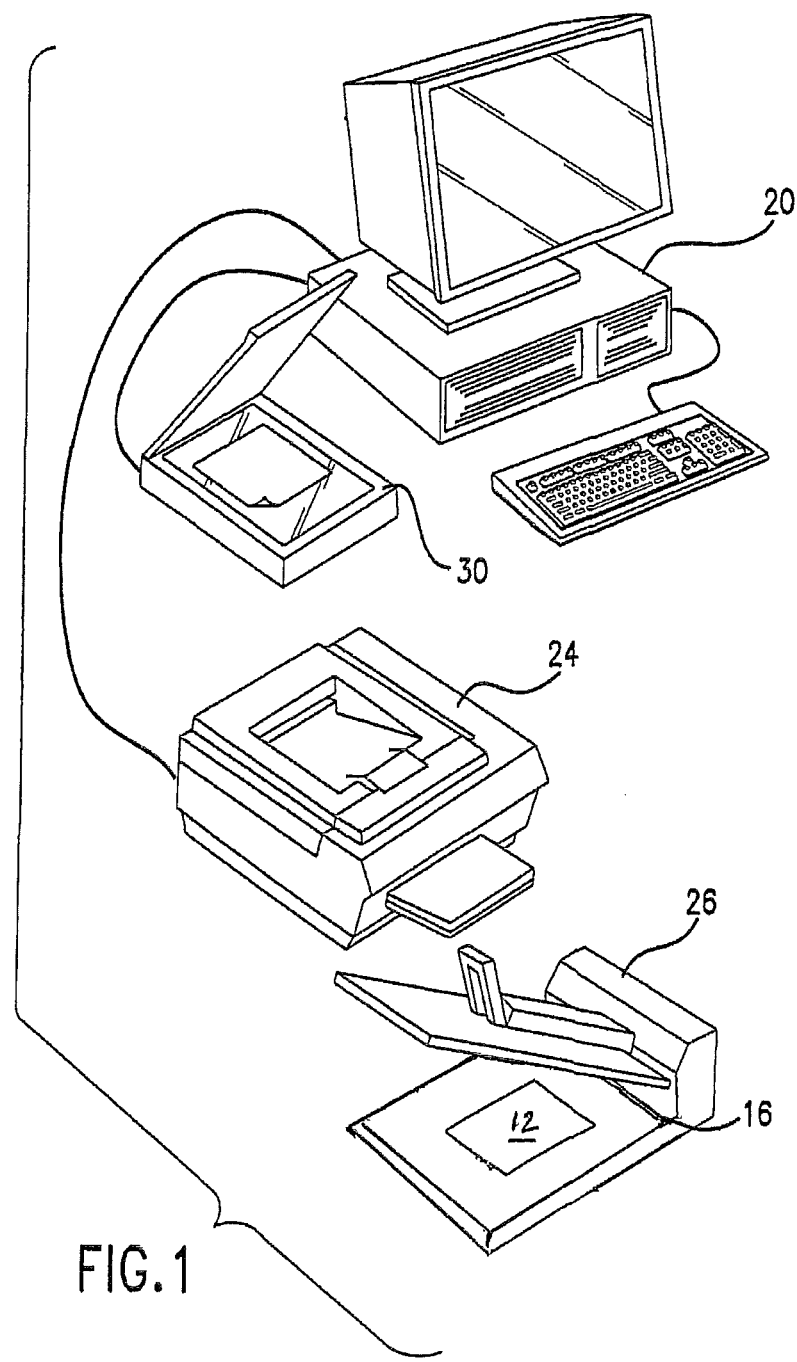
FIG. 1 demonstrates a preferred process of digitally printing and transferring an image according to the invention.
Figure 2:
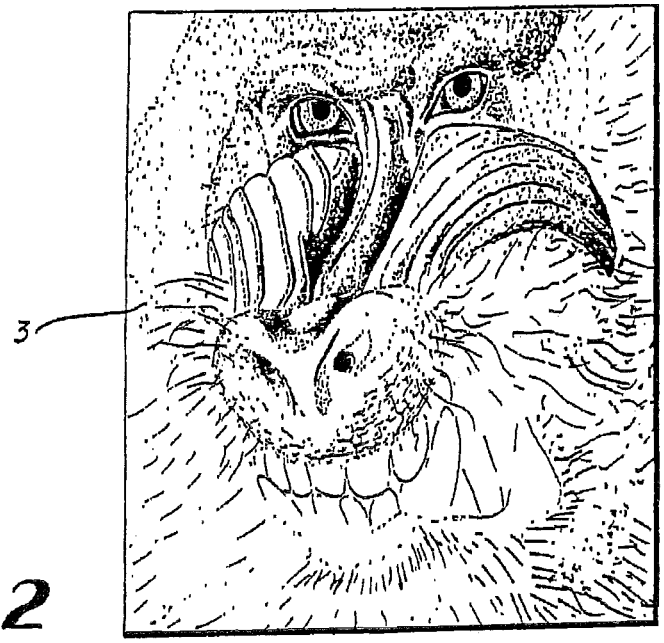
FIG. 2 demonstrates a sheet or tile of a flooring material that has been imaged by a heat transfer process according to the invention.

An object of the present invention is to provide a flooring material that is suitable for heat transfer imaging. The flooring material must be able to withstand a heating process during imaging without material physical thermal shrinkage or image distortion.

In one embodiment of the invention, the flooring material comprises at least two layers. A first layer may comprise a clear or light-colored heat transfer image receptive top layer that comprises vinyl materials, and a second lower layer, or underlayer, that acts as a thermal shrinkage control layer that is firmly bound to the top layer.

An exemplary imaging process according to the invention uses vinyl flooring material as a finally imaged substrate. Vinyl flooring is a flooring material that comprises a vinyl group. In one embodiment, liquid ink comprising sublimable colorants is digitally printed on an intermediate transfer sheet, which may be paper. The colorants are subsequently heated to their heat activation temperature(s), whereupon the colorants activate and transfer to the vinyl flooring material. In the case of sublimation colorants or dyes, heat activation causes the sublimation colorants to sublime and bind to the vinyl flooring material, for which the sublimable colorants have an affinity. Heat activation of colorants comprising sublimatiotn dyes typically occurs between 160° C. and 210° C., or about 325° F. and 410° F.

In other embodiments, the image formed on the flooring substrate may be created by directly printing or applying inks or toners comprising thermally diffusible colorants, including pigmented colorants, disperse dyes and sublimation dyes. The image is fixed to the substrate by a subsequent fixation process, which may be a thermal and/or radiation process. Temperatures used for the thermal fixation process are typically between 160° C. and 210° C., or about 325° F. and 410° F.

In order to decrease thermal shrinkage and enhance the image thermal stability of the vinyl flooring material, in one embodiment of the present invention, a cast vinyl material is used. The flooring material of this embodiment may comprise sheet shaped vinyl (polyvinyl chloride or polyvinylidene chloride) articles. Cast vinyl flooring may be directly formed at the required thickness where the molecules in the polymer matrix are in a thermal equilibrium stage at the forming temperature (above ambient temperature) without allowing the vinyl ingredients to carry a 'thermal memory' during the film forming process. Therefore, they are more stable. Furthermore, cast vinyl sheeting flooring materials have better conformability and light fastness properties. In contrast, calendaring vinyl is formed by pulling the vinyl material through thermomechanical forces along the sheeting dimensions. The thickness of the receptive vinyl polymer layer may be in the range of 15 to 250 microns.

A thermal-ageing or thermal-conditioning process may be used according to the present invention. This thermal-ageing process allows the vinyl composition, with or without the underlayer, to be subjected to a temperature near the heat transfer imaging temperature, but prior to the heat transfer imaging process, so that thermal equilibrium throughout the polymer matrix can be achieved. This is especially useful if a non-cast type of vinyl floor sheet or tile is to be used. Furthermore, such a thermal-ageing or conditioning process helps to remove undesired plasticizers or plasticizer residues in the receptive vinyl polymer matrix.

The thermal-ageing temperature should be near the heat transfer imaging temperature. Temperatures that are materially lower, such as a 25° F. difference, are not likely to be effective in achieving thermal equilibrium. The ageing process can be performed during vinyl flooring sheet manufacturing, following the sheet forming step, but prior to binding the underlayer. Ageing may also be performed prior to the heat transfer imaging process. Depending on the specific vinyl material, a thermal-ageing temperature between 325° F. and 400° F. can be used, and for many materials, the preferred temperature is between 325° F. to 375° F., and an ageing time period between 30 seconds to 300 seconds.

In another embodiment, no plasticizer or superplasticizer materials are used in forming the receptive vinyl layer, or minimal use of these materials is employed. Plasticizers are additives that help the plasticity and/or flexibility of the vinyl materials during the sheet forming, but may be harmful to humans and to the environment. These materials are also detrimental to image stability. Commonly used plasticizers for vinyl sheet forming are phthalates or phthalate esters including di-2-ethyl hexyl phthalate (DEHP), diisodecyl phthalate (DIDP), diisononyl phthalate (DINP), Dindecyl phthalate (DUP), and benzylbutylphthalate (BBP). Linseed oil, tall oil or the like that are not fully polymerized, while entrapped inside the linoleum products, may also act as plasticizers, and may be harmful to image stability. Therefore, their use is preferably avoided. Preferably less than 1% of the total non-phthalate type of plasticizers is to be used for the present invention, and most preferably no plasticizer is to be used in forming the vinyl receptive layer. Examples of non-phthalate plasticizers include but not limited to Hexamoll® DINCH by BASF, Colorite® series by Colorite Polymers, and Eastman™ DBT by Eastman Chemicals.

In order to maintain excellent conformity and flexibility with low or no external plasticizer, it is preferred to use polyvinyl chloride (PVC) with an average mean molecular weight (Mn) from 1,000 to 100,000, and most preferably from 2,000 to 10,000.

Optionally, thermoset polymer materials with high sublimation printing receptivity may be used as part of the receptive vinyl composition. These polymers not only enhance heat transfer imaging receptivity to enhance color vividness of the final images, but also prevent colorant thermal migration inside the vinyl polymer matrix. This is contrasted with thermoplastic materials that lack 'locking' properties of the sublimation colorant after the printing. On a microscopic scale, these polymers provide improved stability of 3-dimensional structures and provide permanency for the sublimation colorants within the vinyl thermoplastic matrix. Synthetic thermoset polymers such as polyester such as polyethylene terephthalate (PET), and polybutylene terephthalate (PBT), polyurethane (PU), polyester glycol such as polyethylene terephthalate glycol (PETG), polyamide (PA) and polyimide (PI) as either homopolymer, copolymer, terpolymer or the like may be used as co-cast, co-extruding, co-calendaring ingredients, or as fillers/additives, during the floor vinyl forming process. Preferably, the thermoset polymer ranges from 1% to 50% by weight.

Colorants, including dyes and pigments, and additives such as thermal or radiation stabilizing agent, polymerization catalyst, blowing agent, radiation blocking agent, optical brighteners, light reflective ingredients, etc. may be used in the receptive vinyl layer to achieve desired thermal, mechanical, acoustic, visual appearance, radiation stability or chemical resistance properties of the flooring article. Negative thermal expansion (NTE) materials may also be used as additives in the vinyl polymer composition. One example of such materials is zirconium tungstate ($ZrW_2O_8$).

In an embodiment of the present invention an underlayer 10 and/or backing 14 for the vinyl flooring material is used. The underlayer of the present invention comprises thermal stabilizing materials such as fiberglass, flax or jute, bamboo, metal, synthetic engineering polymer scrim or fiber embedded structure along the sheeting axes (x-y plane). The underlayer is preferred to achieve the requirements of ASTM F1303 (Standard Specification for Sheet Vinyl Covering with Backing). The scrim or fiber material has a relatively smaller thermal expansion coefficient. For example, the linear thermal expansion coefficient of polyvinyl chloride (PVC) is $5.2 \times 10^{-5}$/C at 20° C., while stainless steel scrim is $1.7 \times 10^{-5}$/C at 20° C., and typical woody material such as bamboo is $0.65 \times 10^{-5}$/C at 20° C. Embedding fibers or scrims with low thermal expansion coefficient fibrous materials with resinous, plastic or rubber composition stabilizes the dimensional structure during heat transfer printing. In the present invention, fibers with a linear thermal expansion coefficient (at 20° C.) of less than $2.0 \times 10^{-5}$/C are preferred to be used.

Natural or synthetic polymers such as rubber latex, melamine or urea formaldehyde (for example hexamethoxymethylmelamine, hydroxymethyl dimenthoxymethyl melamine, dimethylol urea, N,N-dimethylol ethylene urea), reactive and non-reactive polymeric siliane, styrene acrylonitrile (SAN), epoxy, polyester, polyurethane, synthetic rubber such as butadiene, styrene butadiene, halo-butyl rubber, neoprene or chloroprene, vinyl such as polyvinyl chloride etc may be used as the main ingredients, either alone or in a mixture, and in combination with the low thermal expansion fibrous materials. The resulting underlayer can be either thermally or chemically bonded to the receptive vinyl layer. To prevent uneven thermal expansion or shrinkage during the transfer or imaging process, the thermal expansion coefficient difference between the resulting underlayer and the receptive vinyl layer should preferably not exceed 5%. The image receptive layer should not shrink dimensionally more than five (5%) percent relative to the shrinkage control layer as a result of the application of heat to said flooring material during imagining of the flooring material. A large difference in thermal expansion between layers may result in undesired bending or curling, or even separation of the layers, after the heat transfer imaging process. The thickness of the underlayer may be in the range of 50 to 500 microns.

In order to prevent unnecessary colorant migration or diffusion into the underlayer, an optional blocking layer 4 may be applied or formed between the underlayer and the receptive vinyl layer. The blocking layer inhibits penetration or migration of colorant from the from the image receptive layer, especially during long term usage. Image sharpness and optical intensity therefore can be maintained throughout the usage of the flooring material. High crosslinking polymeric/resinous materials with little to no affinity and/or with little to no colorant permeation tendencies are preferred to form the blocking layer. Examples of such material include high density polyethylene or polypropylene, metalized polyethylene or polypropylene, polyether acrylate, epoxide polymer, polysiloxanes, cellulose or modified cellulose polymer, or organometallic polymeric materials.

In one embodiment, the fibrous material is oriented so that fibers or scrims are laid along the underlayer sheeting plane biaxially (x-y plane instead of z-axis), so the plenary thermal expansion or shrinkage is optimally controlled. Preferably, no less than 1% by weight of the low expansion coefficient fibers are used in the underlayer and more preferably no less than 5% by weight is used.

Figure 3:
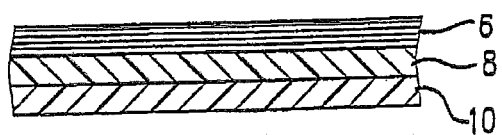
FIG. 3 demonstrates layers of an embodiment of a flooring material that is useful with the present invention.
Figure 4:
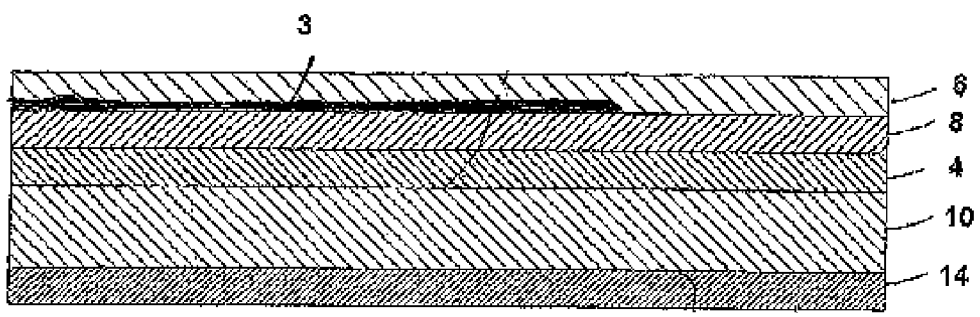
FIG. 4 shows the imaged flooring material according to an additional embodiment of the invention.

An optional clear or transparent pass-through polymer layer 6 is applied to the surface of the receptive vinyl layer 8, which is applied over the underlayer 10 or backing. FIG. 3. The clear or transparent layer may be produced by either lamination or coating. The term 'pass-through' as used herein means that the heat activatable or sublimation colorant printed on the transfer medium will sublimate or diffuse through the polymeric layer and condense and deposit on the receptive vinyl layer during the heat transfer step. However, such a layer will not allow material cold diffusion of the sublimation image after the transfer process is completed. As such, additional mechanical, radiation and chemical protection can be provided through the coverage of the pass-through polymer layer.

The clear or transparent pass-through coating further comprises at least one clear polymeric or resinous material(s) with little to no affinity to gasified or condensed sublimation dye, and allows the pass through of the sublimation image from the outside of the layer to the receptive vinyl during the transfer printing process. The image then bonds permanently to the receptive vinyl layer, and underneath the pass-through layer. Thermoset or thermoplastic polymeric materials capable of forming a passing-through layer or membrane, which may be natural or synthetic, may be used as ingredient of the coating. In order to achieve light fastness and mechanical stability, thermosetting polymeric material(s) with various additives may be used or formed by a crosslinking reaction to create firm bonding, and a non-tacky pass-through layer that eliminates peeling issues during the heat transfer process, as taught by U.S. Patent Application Ser. No. 61/260,442 and PCT/US10/56365.

Oxygen and ozone in air may permeate through the pass-through layer and create decreased light fastness of the printed image. Additives in the polymer layer with oxygen blocking or scavenging properties (antioxidant) may be used. Non-polymeric oxygen scavenging chemical examples include ascorbic acid, ascorbate, carbohydrazide, erythorbate, methylethylketoxime, hydroquinone, and diethylhydroxylamine, unsaturated fatty acid, 2,6-di(t-butyl)-4-methylphenol (BHT), 2,2'-methylene-bis(6-t-butyl-p-cresol), and triphenylphosphite. Polymeric oxygen scavengers and/or antioxidants (Oxygen Scavenging Polymers—OSP) such as polypropylene, polybutadiene, polyisoprene, ethylene-cyclohexenylmethyl acrylate copolymer (ECHA), and ethylene-methylacrylate-cyclohexenylmethyl acrylate terpolymer (EMCM) may also be used in the pass-through polymer layer.

Example Composition of the clear Pass-through Polymer Layer:

| | |
|---|---|
| Hexamethoxymethyl Malamine resin | 0-45% |
| Co-reactant | 0-50% |
| Catalyst | 0-3% |
| Releasing Agent | 0-10% |
| Oxygen scavenger/antioxidant | 0-5% |
| Abrasion-resistant additives | 0-5% |
| Other Coating Additives | 0-15% |
| Carrier | balance |

The dry coat weight of the clear or transparent pass-through layer generally ranges from 0.5-25 g/m$^2$, and is preferred to be 1-3 g/m$^2$.

An image is printed on an intermediate base sheet 12. The image may be printed by a digital printer, such as a computer driven ink jet printer 24. After the image is printed on the medium, the image is ready for transfer from the medium to the vinyl flooring material.

The use of computer technology allows substantially instantaneous printing of images. For example, video cameras or scanners 30 may be used to capture a color image on a computer 20. Images created or stored on a computer may be printed on command, without regard to run size. The image from the computer may be printed or transferred onto the vinyl flooring material by any suitable printing means, including those capable of printing in multiple colors, including mechanical thermal printers, ink jet printers and electrophotographic or electrostatic printers, and transferred, as described above.

Computers and digital printers are inexpensive, and transfers of photographs and computer generated images may be made to substrates 16. These transfers may be produced by end users at home, as well as commercial establishments. The image is transferred by the application of heat as described above. An iron for clothing, or a heat press 26 intended to accomplish such transfers, are examples of devices that may be used for heat transfer.

What is claimed is:

1. A process for imaging a flooring material, comprising the steps of:
    forming a printed image comprising a heat activatable colorant, wherein the printed image is positioned so that the heat activatable colorant contacts a surface of a section of flooring material, and wherein the section of flooring material comprises an image receptive layer that has an affinity for the heat activatable colorant; and
    applying heat to the printed image, wherein the heat activates the heat activatable colorant, and the heat activated heat activatable colorant binds to the flooring material to form an image on the flooring material;
    wherein the flooring material comprises a vinyl material and a shrinkage control layer, and wherein the image receptive layer dimensionally shrinks not more than five (5%) percent relative to the shrinkage control layer as a result of the application of heat to said flooring material during imaging of the flooring material.

2. A process for imaging a flooring material according to claim 1, wherein the image receptive layer of the flooring material comprises a vinyl group.

3. A process for imaging a flooring material according to claim 1, further comprising the step of thermally aging the image receptive layer by applying heat to the image receptive layer prior to imaging the flooring material.

4. A process for imaging a flooring material according to claim 1, further comprising the step of thermally aging the image receptive layer by applying heat to the image receptive layer at a temperature that is not materially lower than a heat activation temperature of the heat activatable colorant, and prior to imaging the flooring material.

5. A process for imaging a flooring material according to claim 1, wherein said flooring material comprises cast vinyl.

6. A process for imaging a flooring material according to claim 1, wherein the shrinkage control layer comprises a fibrous material.

7. A process for imaging a flooring material according to claim 1, wherein the shrinkage control layer has a linear thermal expansion coefficient (at 20° C.) of less than $2.0 \times 10^{-5}$/° C.

8. A process for imaging a flooring material according to claim 1, wherein the image receptive layer of the flooring material comprises a thermoset polymer.

9. A process for imaging a flooring material according to claim 1, wherein the image receptive layer of the flooring material comprises a vinyl group, and wherein the heat activatable colorant has an affinity for the vinyl group and binds to the vinyl group to form the image.

10. A process for imaging a flooring material according to claim 1, wherein the heat activatable colorant comprises sublimation dye, and the image receptive layer of the flooring material comprises a vinyl group, and wherein the sublimation dye sublimes upon the application of heat, and the sublimed sublimation dye has an affinity for the vinyl group and binds to the vinyl group to form the image.

11. A process for imaging a flooring material according to claim 1, wherein the flooring material further comprises a pass through layer, wherein the pass through layer has little to no affinity to the heat activatable colorant, and wherein the heat activatable colorant passes through the pass though layer upon heat activation and does not materially bind to the pass through layer, and wherein the heat activatable colorant passes through the pass though layer and binds to the image receptive layer.

12. A process for imaging a flooring material according to claim 1, wherein the flooring material further comprises a blocking layer positioned between the image receptive layer and the shrinkage control layer, wherein the blocking layer inhibits passage of the image through the image receptive layer to the shrinkage control layer after imaging of the flooring material.

13. A process for imaging a flooring material according to claim 1, wherein the flooring material further comprises a transparent pass through layer, wherein the pass through layer comprises a resinous material and the pass through layer has little to no affinity to the heat activatable colorant, and wherein the heat activatable colorant passes through the pass though layer upon heat activation and does not materially bind to the pass through layer, and wherein the heat activatable colorant passes through the pass though layer and binds to the image receptive layer.

14. A process for imaging a flooring material according to claim 1, wherein the flooring material further comprises a transparent pass through layer, wherein the pass through layer has little to no affinity to the heat activatable colorant, and wherein the heat activatable colorant passes through the pass though layer upon heat activation and does not materially bind to the pass through layer, and wherein the heat activatable colorant passes through the pass though layer and binds to the image receptive layer.

15. A process for imaging a flooring material according to claim 1, wherein the image receptive layer of the flooring material comprises polyurethane, and wherein the heat activatable colorant has an affinity for the polyurethane, and the heat activatable colorant binds to the polyurethane to form the image.

16. A process for imaging a flooring material according to claim 1, wherein the image receptive layer of the flooring material comprises polyester, and wherein the heat activatable colorant has an affinity for the polyester, and the heat activatable colorant binds to the polyester to form the image.

17. A process for imaging a flooring material according to claim 1, wherein the flooring material comprising the shrinkage control layer is manufactured prior to imaging the flooring material according to the process of claim 1.

* * * * *